Patented July 20, 1943

2,324,784

UNITED STATES PATENT OFFICE 2,324,784

CONDENSATION PRODUCT AND METHOD OF PREPARING AND USING SAME

Eugene Lieber, Staten Island, N. Y., assignor to Standard Oil Development Company, a corporation of Delaware No Drawing. Application January 2, 1941, Serial No. 372,890

19 Claims. (Cl. 252—59)

This invention relates to a novel type of chemical condensation product and to methods of preparing such products and using them for various purposes, more particularly as pour depressors in waxy lubricating oils.

One object of the invention is to make our depressors from raw materials not known heretofore to be capable of being used to make pour depressors.

Broadly, the invention comprises the production of wax modifying agents by chemically condensing a low molecular weight aliphatic olefin with an aromatic compound.

The low-boiling low molecular weight aliphatic olefins to be used according to this invention can be represented by the generic formula

R—CH=CH—R′ where R and R′ represent either hydrogen or alkyl groups having a total of less than 8 carbon atoms and R and R′ may be the same or different. Typical examples of these olefins are ethylene, propylene, butylenes, amylenes and hexylenes. The groups R and R′ may be either straight chain or branched. Individual pure olefins may be used or mixtures thereof; and also commercial mixtures of low-boiling olefins are especially suitable such as volatile cracked gasolines, mixed amylenes, etc. Olefins having a total of from 3 to 8 carbon atoms are preferred.

The aromatic compounds which are to be condensed with the olefins described above should preferably be hydrocarbons, and preferably should be polynuclear hydrocarbons such as naphthalene, anthracene, phenanthrene, fluorene, diphenyl, and the like, although mononuclear aromatic compounds may also be used such as benzene, toluene, xylene, amyl benzene, and the like. Other aromatic compounds such as hydroxy aromatic compounds, e. g., phenol, alpha- and beta-naphthol, the various cresols and their derivatives, etc., may also be used.

To effect the condensation, it is preferred to use a Friedel-Craft catalyst, preferably anhydrous aluminum chloride, although other Friedel-Craft catalysts can be used, such as boron fluoride, zinc chloride, ferric chloride, titanium tetrachloride, boron trichloride and in some cases even anhydrous hydrogen fluoride. Other types of catalysts may be used such as strong mineral acids, e. g., sulfuric acid, phosphoric acid, etc., phosphorus pentoxide, hydrogen fluoride, etc.

The proportions in which the reactants should be used are usually about 0.3 to 3.0, preferably 1.0 to 2.0 mols, of aromatic compound to 1 mol of low molecular weight aliphatic olefins. When a Friedel-Craft type of catalyst is used, the amount thereof should be about .05 to 0.5 mol of catalyst per mol of olefin. With other types of catalyst, the amount to be used should be such as to give approximately similar results. The amount of catalyst to be used may vary over a very wide range, depending partly upon the nature and amount of the reactants, as well as on the temperature and the time of reaction.

In carrying out the invention, the reaction temperature should be maintained between the approximate limits of room temperature and about 300° F. It is preferred to add the catalyst to the reactants gradually at room temperature and then to heat the reaction mass to a temperature of between about 150° to 250° F. and to maintain it there for a sufficient length of time such as ½ hour to a number of days, preferably 1 to 10 hours, to produce the desired product. The temperature and time should be adjusted to obtain the desired combination of high yields and potent pour depressor.

Although it is not necessary to use a solvent in carrying out the condensation, it is preferable to do so; as suitable inert solvents may be mentioned a highly refined naphtha or kerosene, tetrachlorethane, carbon disulfide, nitrobenzene, etc. The order in which the materials to be used should be mixed may be varied as desired but a very suitable one is to mix the aromatic compound and the catalyst together preferably suspended in a suitable solvent, and then to add the olefin gradually to the mixture. Another alternative procedure is to mix the aromatic compound and the olefin first and then to add the catalyst.

After the reaction has been completed, which may in many cases be judged by the approximate cessation of the evolution of the hydrogen chloride, the reaction mixture is cooled with an inert diluent such as a refined kerosene and then neutralized by any of the known methods such as by an aqueous solution of caustic soda, or in the case of Friedel-Craft catalyst, merely water alone or a mixture of water and alcohol, etc. The kerosene extract is allowed to settle and the catalyst layer is drawn off and then the kerosene layer is filtered if necessary to remove any insoluble products and then distilled to remove solvent and low-boiling products. This distillation is preferably carried out under vacuum or with fire and steam to about 600° F.

The condensation product of this invention is soluble in mineral lubricating oils and is substantially non-volatile at 600° F., having a fairly high molecular weight. In most cases it is a viscous green oil, although in some cases it is a brown or a green-brown oil. Although the chemical structure of these products is not known with certainty, it is believed that they are or less the same procedure as that described above, except that different types and amounts of reactants or catalysts were used, various solvents and different reaction temperatures. The results of all of these tests are summarized in the following table.

Table

| Test No. | Low M. W. olefins | | Aromatic compound | | Cat. AlCl₃ | Solvent | | Temp. | Time | Product | | |
|---|---|---|---|---|---|---|---|---|---|---|---|---|
| | Name | Grams | Name | Grams | | Name | Cc. | | | Yield | Pour point of blend¹ | Appearance of product |
| | | | | | Grams | | | °F. | Hrs. | Grams | °F. | |
| 1 | Amylenes² | 140 | Naphthalene | 256 | 42 | Kerosene | 300 | 200 | 3 | 243 | 0 | Visc. green oil. |
| 2 | ____do____ | 140 | ____do____ | 256 | 42 | C²H²Cl⁴ | 300 | 200 | 3 | 151 | −15 | Do. |
| 3 | ____do____ | 70 | ____do____ | 256 | 21 | Kerosene | 300 | 200 | 3 | 161 | 0 | Visc. green-brown oil. |
| 4 | ____do____ | 210 | Benzene | 234 | 10 | ____do____ | 300 | 250 | 3 | 18 | −15 | Brown resin. |
| 5 | ____do____ | 210 | ____do____ | 234 | 63 | ____do____ | 300 | 250 | 3 | 42 | +10 | Brown oil. |
| 6 | ____do____ | 140 | Diphenyl | 308 | 42 | C²H²Cl⁴ | 300 | 200 | 3 | 169 | −10 | Green visc. oil. |

¹ Blend of 2% of condensation product in waxy lubricating oil base stock having pour point of +30° F.
² "Mixed amylenes" of commerce.

composed essentially of high molecular weight linear or chain type compounds composed of more or less regularly alternating aromatic and aliphatic groups. These aromatic groups may also have some free aliphatic side chains in case the aromatic compound used as raw material was an alkylated aromatic compound, or in case a substantial molecular excess of olefins to aromatics were used in carrying out the condensation.

The product of this invention has the property of modifying the crystal structure of waxes such as paraffin wax present when added to compositions containing the same. For instance, when about 0.05–10.0%, preferably 0.2–5.0%, of this wax modified is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc., or for making various molded products.

For the sake of illustration, but without limiting the invention to the particular materials used, the following experimental data are given:

42 grams of anhydrous AlCl₃ and 256 grams of naphthalene were suspended in 300 cc. of kerosene (heavily pretreated with AlCl₃ before use) and contained in a 3-liter-4-neck round bottom flask fitted with mechanical stirrer, thermometer, and dropping funnel and cooled by running tap-water. 140 grams of "mixed amylenes" of commerce were slowly added to the reaction mixture drop by drop over a period of 45 minutes. After the addition of the amylenes, the reaction temperature was increased to 200° F., and maintained thereat for 3 hours with continuous agitation. At the end of this period the reaction mixture was cooled and diluted with a further quantity of kerosene and neutralized by means of a mixture of alcohol and water. The kerosene extract, after settling, was distilled with fire and steam to 600° F., in order to remove solvent and low-boiling products. A bottoms residue comprising 243 grams of a viscous green oil was obtained as product.

A number of other tests were made using more

The above table shows that the condensation product of low molecular weight olefins and aromatic compounds made according to this invention are good pour depressors in waxy lubricating oils, since an addition of 2% of the condensation product to a waxy lubricating oil base stock having a pour point of +30° F. lowered (depressed) the pour point down to as low as −15° F. The naphthalene used in the first three examples was much more effective than the benzene used in tests 4 and 5. It is true that in test 4 with benzene the product gave a pour point of −15° F. but the yield was relatively very small and, when the amount of catalyst was increased (test 5) to try to obtain a larger yield, there was a substantial increase in the yield but the potency of the pour depressor was not as good as in test 4. The polynuclear compound tests, namely, the naphthalene and diphenyl, both resulted in good pour depressor potency and also good yields.

It is not intended that this invention be limited to any of the specific examples which were given merely for the sake of illustration nor to any theory as to the mechanism of the operation of the invention but only by the appended claims in which it is intended to claim all novelty inherent in the invention as broadly as the prior art permits.

I claim:

1. A composition consisting essentially of a Friedel-Craft condensation product of an aliphatic olefin having less than 10 carbon atoms with an aromatic compound, said condensation products being substantially non-volatile at temperatures up to about 600° F. under conditions of fire and steam distillation and having wax modifying properties.

2. A product consisting essentially of an oil-soluble Friedel-Craft condensation product of an aliphatic olefin having from 3 to 8 carbon atoms with an aromatic hydrocarbon, being non-volatile at temperatures up to about 600° F. under conditions of fire and steam distillation and having wax modifying properties.

3. A product consisting essentially of an oil-soluble Friedel-Craft condensation product of an aliphatic olefin having from 3 to 8 carbon atoms with a polynuclear aromatic hydrocarbon, said condensation product being substantially non-volatile at temperature up to about 600° F. under conditions of fire and steam distillation and having wax modifying properties.

4. A product consisting essentially of an oil-soluble Friedel-Craft condensation product of an amylene with a polynuclear aromatic hydrocarbon, said condensation product being substantially non-volatile at temperatures up to about 600° F. under conditions of fire and steam distillation and having wax modifying properties.

5. A product consisting essentially of an oil-soluble aluminum chloride condensation product of an amylene with naphthalene, said condensation product being substantially non-volatile at temperatures up to about 600° F. under conditions of fire and steam distillation and having pour-depressing properties.

6. The process which comprises chemically condensing an aliphatic olefin having less than 10 carbon atoms with an aromatic compound in the presence of a Friedel-Craft catalyst and recovering from the reaction product a fraction substantially non-volatile at temperatures up to about 600° F. under conditions of fire and steam distillation, having wax-modifying properties.

7. The process of preparing wax modifiers which comprises condensing an aliphatic olefin having 3 to 8 carbon atoms with an aromatic hydrocarbon in the presence of a condensing catalyst, and recovering from the Friedel-Craft products a fraction which is soluble in hydrocarbon oils and substantially non-volatile at temperatures up to about 600° F under conditions of fire and steam distillation, having wax modifying properties.

8. The process of preparing wax modifiers which comprises condensing an aliphatic olefin having from 3 to 8 carbon atoms with a polynuclear aromatic hydrocarbon in the presence of a Friedel-Craft catalyst at a temperature between about room temperature and about 300° F., and distilling the condensation products in the presence of steam to obtain therefrom a fraction which is soluble in hydrocarbon oils and substantially non-volatile at temperatures up to about 600° F. under conditions of fire and steam distillation, having wax modifying properties.

9. The process of preparing wax modifiers which comprises mixing an aromatic hydrocarbon and a Friedel-Craft catalyst in a solvent and then gradually adding an aliphatic olefin having less than 10 carbon atoms, maintaining a reaction temperature between the approximate limits of room temperature and about 300° F., until the condensation reaction is completed, removing the catalyst and subjecting the condensation products to distillation under low partial pressure to obtain a fraction which is substantially non-volatile at temperatures up to about 600° F. having wax modifying properties.

10. The process of preparing wax modifiers which comprises condensing an amylene with a polynuclear aromatic hydrocarbon in the presence of a Friedel-Craft catalyst at a temperature between the approximate limits of room temperature and 300° F., hydrolyzing and removing the catalyst and distilling the condensation product under low partial pressure to about 600° F. to obtain a distillation residue soluble in hydrocarbon oils and having wax-modifying properties.

11. The process of preparing wax modifiers which comprises condensing an amylene with a naphthalene in the presence of a Friedel-Craft catalyst at a temperature between the approximate limits of room temperature and 300° F., hydrolyzing and removing the catalyst and distilling the condensation product under low partial pressure to about 600° F. to obtain a distillation residue soluble in hydrocarbon oils and having wax-modifying properties.

12. The process of preparing pour-depressors which comprises condensing about 1 mol of mixed amylene with about 1 to 2 mols of naphthalene in the presence of about .05 to 0.5 mol of aluminum chloride per mol of the mixed amylene at a temperature between the approximate limits of room temperature and about 300° F., in the presence of an inert solvent, cooling and diluting the reaction mass by addition of a substantial volume of refined kerosene as inert diluent, hydrolyzing the catalyst by addition of aqueous alcohol, settling to cause separation of an aqueous catalyst layer and a kerosene layer, removing the aqueous layer and subjecting the kerosene layer to distillation with fire and steam to about 600° F., whereby a distillation residue is obtained which is soluble in hydrocarbon oils and has pour-depressing properties.

13. A composition comprising a Friedel-Craft condensation product of an aliphatic olefin having less than 10 carbon atoms with an aromatic compound, said condensation product being substantially non-volatile at temperatures up to about 600° F. under conditions of fire and steam distillation and having wax modifying properties.

14. A composition comprising a hydrocarbon wax and in association therewith a wax modifier consisting essentially of an oil-soluble Friedel-Crafts condensation product of an aliphatic olefin having less than 10 carbon atoms with an aromatic hydrocarbon, said condensation products being substantially non-volatile at temperatures up to about 600° F. under conditions of fire and steam distillation.

15. A composition comprising a major proportion of a hydrocarbon oil and a small amount of a wax modifier consisting essentially of an oil-soluble Friedel-Craft condensation product of an aliphatic olefin having from 3 to 8 carbon atoms with an aromatic hydrocarbon, said condensation product being substantially non-volatile at temperatures up to about 600° F. under conditions of fire and steam distillation.

16. A composition comprising a major proportion of a waxy lubricating oil and a small amount of a pour depressor consisting essentially of an oil-soluble Friedel-Craft condensation product of an aliphatic olefin having from 3 to 8 carbon atoms with a polynuclear aromatic hydrocarbon, said condensation product being substantially non-volatile at temperatures up to about 600° F. under conditions of fire and steam distillation.

17. A composition comprising a major proportion of a waxy lubricating oil and a pour-depressing amount of an oil-soluble aluminum chloride condensation product of an amylene with a polynuclear aromatic hydrocarbon, said condensation products being substantially non-volatile at temperatures up to about 600° F. under conditions of fire and steam distillation.

18. A composition comprising a major proportion of a waxy lubricating oil and a pour-depressing amount of an oil-soluble aluminum chloride condensation product of an amylene with naphthalene, said condensation product being substantially non-volatile at temperatures up to about 600° F. under conditions of fire and steam distillation.

19. A lubricating composition comprising a major proportion of a waxy lubricating oil and a pour-depressing amount of a wax modifier made according to the process of claim 9.

EUGENE LIEBER.